United States Patent [19] [11] 3,978,154
Yukuta et al. [45] Aug. 31, 1976

[54] PROCESS FOR THE MANUFACTURE OF IMPROVED ELASTOMERS PREPARED BY REACTION OF TRIMELLITOYL-FUNCTIONAL POLYMER WITH EPOXY COMPOUND

[75] Inventors: Toshio Yukuta; Takao Aoki; Takashi Ohashi, all of Kodaira; Kouichi Iwami, Kunitachi; Akira Suzuki, Tanashi, all of Japan

[73] Assignee: Bridgestone Tire Company Limited, Tokyo, Japan

[22] Filed: Aug. 16, 1974

[21] Appl. No.: 498,224

Related U.S. Application Data

[63] Continuation-in-part of Ser. No. 245,611, April 19, 1972, abandoned.

[30] Foreign Application Priority Data

Apr. 22, 1971 Japan.............................. 46-25654

[52] U.S. Cl............................. 260/835; 260/37 EP; 260/40 R; 260/42.28; 260/830 R; 260/837 R; 260/836
[51] Int. Cl.² ........................................ C08L 63/00
[58] Field of Search..................... 260/835, 836, 837

[56] References Cited
UNITED STATES PATENTS

| | | | |
|---|---|---|---|
| 3,140,299 | 7/1964 | Loncrini | 260/346.3 |
| 3,437,671 | 4/1969 | Sandler | 260/834 |
| 3,555,111 | 1/1971 | Benham | 260/836 |
| 3,609,110 | 9/1971 | Chofushi | 260/29.7 |

Primary Examiner—Paul Lieberman
Attorney, Agent, or Firm—Haseltine, Lake & Waters

[57] ABSTRACT

The present invention relates to a process for manufacturing a new elastomer having high elasticity, mechanical strength and processability from epoxy compounds, trimellitoyl-functional polymers and a third element. The third element is any of acid anhydride compounds having a molecular weight lower than 700, and having at least one acid anhydride group, such as maleic, phthalic, succinic, adipic, trimellitic, pyromellitic, and benzophenone tetracarboxylic anhydrides. It is, according to another aspect, an improvement of physical properties, especially tensile and tear strengths of the elastomer manufactured by reacting said first two elements according to the copending application Ser. No. 143,643, filed May 14, 1971, while keeping desirably low exothermicity and thermal contraction during the curing.

12 Claims, No Drawings

PROCESS FOR THE MANUFACTURE OF IMPROVED ELASTOMERS PREPARED BY REACTION OF TRIMELLITOYL-FUNCTIONAL POLYMER WITH EPOXY COMPOUND

This application is a Continuation-In-Part application of Ser. No. 245,611 filed on Apr. 19, 1972 now abandoned.

The present invention relates to a process for manufacturing a new elastomer having high elasticity, mechanical strength and processability from an epoxy compound, a trimellitoyl-functional polymer and an additive element, with lowering exothermicity and thermal contraction during the curing. According to another aspect of the invention, it relates to an improvement of physical properties, especially tensile strength and tear strength of the elastomer manufactured by reacting the epoxy compound with the trimellitoyl-functional polymer according to copending application Ser. No. 143,643, filed May 14, 1971.

It has been proposed in said copending application to manufacture an elastomer by reacting one or more of the trimellitoyl-functional polymers represented by the formula;

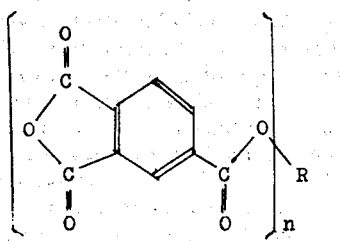

in which R means a residue of a hydroxyl-functional polymer and $n$ is an integer of at least 2, which has been prepared by reacting a hydroxyl-functional polymer of the number average molecular weight higher than 700 and having two or more hydroxyl groups at the molecular ends or the side chain with a trimellitic acid anhydride or a derivative thereof, with one or more epoxy compounds having at least one epoxy group. According to the invention, one or more aliphatic, alicyclic and aromatic acid anhydrides having a molecular weight lower than 700 and having at least one acid anhydride group is added thereto so as to improve the physical properties, especially tensile and tear strengths.

The reaction of an epoxy compound with an anhydride compound has been widely utilized for manufacturing an adhesive, a paint and a cured resin product, and thus it has been in public knowledge to react for instance a polyepoxy compound with a carboxylic anhydride to prepare a cured resin product having high mechanical, thermal and electrical resistances. Such compounds as those having two or more epoxy groups in the molecule are generally called epoxy resins. When such epoxy resin is reacted with a curing agent comprising a polycarboxylic acid such as oxalic, maleic, and phthalic acids or the anhydrides thereof, the resulting cured epoxy resin product is superior to that prepared with a polyamine as curing agent, in electrical properties, heat resistance, and especially in lower exothermicity during curing, so that it is suitable for preparation of large mold articles.

Furthermore, it has been well known in U.S. Pat. No. 3,437,671 that an adhesive having excellent adhesive properties is obtained by reacting an epoxy compound with an anhydride polyester in the presence of a curing agent such as an anhydride or amine. In said patent, the anhydride or amine is used as a curing agent and the amount to be used is 0 to 5 parts to 100 parts of the anhydride polyester. Namely said anhydride or amine is used in the amount of 0 to 0.33 equivalent relative to 1 equivalent of the anhydride group of anhydride polyester.

As mentioned above, it is usual to use a curing agent such as anhydride or amine in the curing reaction of the epoxy compound. However, the cured epoxy resin obtained by the curing reaction of the above epoxy compound is inferior in the flexibility, and brittle, and the elongation thereof is only 1 to 10%.

The inventors succeeded in improving the elasticity of said epoxy resins by using the new trimellitoyl-functional polymer as curing agent, as disclosed in the copending application mentioned above.

The inventors have continued to study these new cured epoxy resin products as elastomers to find out that the addition of some low molecular weight acid anhydride compounds to the epoxy compound and the trimellitoyl-functional polymer can improve the physical properties of the resulting elastomer, especially the tensile and tear strengths due to the low exothermicity and thermal contraction on curing. The invention is based on these findings.

The trimellitoyl-functional polymers of the formula referred to above and to be used in the invention may be prepared by reacting a hydroxyl-functional polymer having a number average molecular weight higher than 700, and having two or more hydroxyl groups at the molecular ends or the side chain, with trimellitic acid anhydride or a derivative thereof as illustrated below;

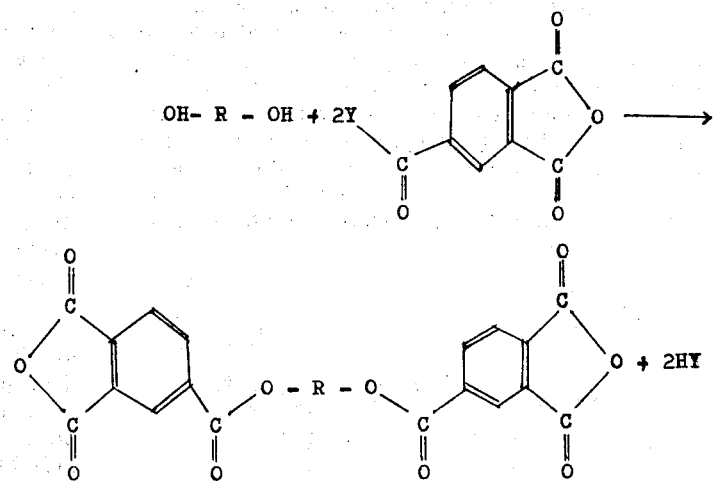

in which Y represents a hydroxyl group, a halide or an alkoxy group, and R represents the same as referred to above.

The hydroxyl-functional polymer to be used in the invention may be either the separated compound or the reaction intermediate, which may be prepared for instance by ozonizing a high polymer compound comprising 2 – 100 weight % olefin unsaturated double bond units in the main or side chain, followed by the reduction of the regulating polymer ozonide with any of the known reducing agents. Examples of high polymers to be subjected to said ozonization-reduction process are polybutadiene, butadiene-styrene copolymer, polyisoprene, butadiene-acrylonitrile copolymer, butadiene-acrylate copolymer and ethylene-propylene-diene terpolymer. The hydroxyl-functional polymer may also be prepared by the radical, cationic or anionic polymerization method, or polyaddition or polycondensation method, in which polymers having a number average molecular weight higher than 700 and having at least two hydroxyl groups such as polyolefin glycols, polyether glycols and polyester glycols can be prepared. As examples there may be mentioned polybutadiene glycol as the polyolefin glycol, polytetramethylene ether glycol as the polyether glycol, and polyethylene adipate glycol as the polyester glycol. It should be noted, however, that said polymers constituting the main chain structure of said trimellitoyl-functional polymer, are not limited to the above.

The epoxy compounds to be used in the invention are such compounds as those having at least one epoxy group with a relatively higher boiling point lest it should be evaporated during the curing treatment at an elevated temperature. Among those having one epoxy group, there are styrene oxide, butadiene monoxide and epoxy stearate. It is preferable, however, to use an epoxy resin having two or more epoxy groups which is used generally for the preparation of the conventional epoxy resin products. As epoxy resins having two epoxy groups, there are exemplified bisphenol A epoxy resin, polyalkylene ether epoxy resin and aliphatic or alicyclic diepoxide. As epoxy resins having three or more epoxy groups, these are illustrated for example by tris-2,3-epoxypropyl-isocyanurate epoxy resin. The epoxy resins to be used in the invention, however, are not limited to the above, and it is possible to use two or more of the epoxy resins in combination.

The acid anhydride compound having a molecular weight lower than 700 to be used as the additive may be either an aliphatic, alicyclic or aromatic acid anhydride. Examples of compounds having one acid anhydride group are maleic, phthalic, tetrahydrophthalic, hexahydrophthalic, methyltetrahydrophthalic, succinic and adipic acid anhydrides, among which phthalic and hexahydrophthalic acid anhydrides are particularly preferable. Examples of compounds having one acid anhydride group and one carboxyl group are trimellitic and tricarballylic acid anhydrides. Examples of compounds having two acid anhydride groups are pyromellitic and benzophenone tetracarboxylic acid anhydrides as well as the compounds represented by the formula;

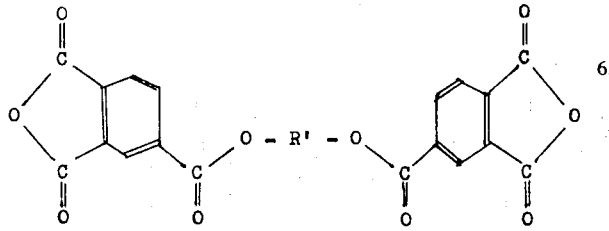

in which R' represents $(CH_2)_2$, $(CH_2)_4$, $(CH_2CH_2)_2O$, or

e.g. ethylene glycol bistrimellitate, xylylene glycol bis-trimellitate. As compounds having three acid anhydride groups, there is exemplified glycerine tristrimellitate. It should be noted that the acid anhydride compound to be used for improving the tensile and tear strengths of the cured epoxy resin according to the invention is not limited to the above and that a combination of two or more thereof may be used. Most of the acid anhydride compounds used as additives are solid or crystalline. When it is difficult to mix said additive as is so that a high temperature is necessary for the mixing, it is preferable to use the acid anhydride compound in the form of an eutectic mixture so as to be in liquid state at room temperature. The acid anhydride group is reacted with the epoxy group generally in the presence of an acidic or basic catalyst to form the ester group. Without the catalyst the reaction will not occur. In reality, however, the reaction is commenced owing to the presence of the hydroxyl group in the epoxy resin, the carboxyl group freed in the acid anhydride or water content eventually existing as impurity, or by means of positively adding alcohol or ethylene glycol as initiator.

Whether the catalyst and/or filler is used or not may be decided depending on the use or purpose of the product elastomer of the invention. There is no particular limitation on the catalyst to be used so far as it can accelerate the reaction between the epoxy and acid anhydride groups. The basic catalysts e.g. a tertiary amine such as pyridine, dimethylbenzylamine, 2-(dimethylaminomethyl)-phenol, 2,4,6-tris(dimethylaminomethyl)phenol and salts thereof, are preferable. Neither is there any particular limitation on the filler. Any of the fillers generally used for manufacturing conventional epoxy resin products such as asbestos, silica, metal powder, as well as the fillers generally compounded in rubber such as carbon black, zinc oxide may be used as occasion demands.

The order of addition of the trimellitoyl-functional polymer, the epoxy resin, the low molecular weight acid anhydride compound, catalyst and filler may be as desired with no particular limitation. The amount of the acid anhydride compounds ranges generally from 0.1 to 3.0 equivalents, and preferably from 0.5 to 2.0 equivalents relative to 1 equivalent acid anhydride group of the trimellitoyl-functional polymer. The total amount of the trimellitoyl-functional polymer and the low molecular weight acid anhydride compound to be used relative to 1 equivalent epoxy group of the epoxy resin ranges generally from 0.5 to 1.5 equivalent with respect to the acid anhydride group; and more preferably from 0.7 to 0.9 equivalent in the absence of the catalyst, and from 0.9 to 1.1 equivalent in the presence of the catalyst. The sort and amount of the catalyst are not particularly limited as referred to above, but for instance in case of the tertiary amine it is sufficient to use an amount less than 0.025 equivalent of the amine group relative to 1 equivalent of the epoxy group of the epoxy resin.

The order of addition of the elements is optional as referred to above, but it is preferable in general firstly to mix the required amounts of the trimellitoyl-functional polymer and the low molecular weight acid anhydride compound together at a temperature higher than the melting point of the latter element, generally at 40° to 200°C with stirring to make a homogeneous mixture.

The temperature of the mixture is lowered down to a range of from room temperature to 80°C, to which the epoxy resin and further the additives such as catalyst and filler as occasion demands are added to be subjected to sufficient stirring and mixing, and then to defoaming treatment under vacuum. The desired elastomer product can be obtained by pouring the mixture into the mold to proceed with the curing at a temperature generally ranging from 100° to 200°C generally for 1 to 5 hours.

The resulting elastomer is a novel substance which is different from the conventional cured epoxy resin products in combination of the high mechanical strength and tenacity together with considerably high elasticity and elongation. This new elastomer has no hydrogen-bonding structure as in the urethane elastomer which causes a fatal disadvantage, i.e. poor heat resistance inevitable to the latter. Thus the product of the invention constitutes a new synthetic rubber or new material for coating, electrical insulation, civil engineering and construction, architecture and adhesives.

The invention will be explained in more detail and definitiveness in reference to some examples merely for the purpose of explanation but not for limiting the invention thereof.

EXAMPLES 1 to 6

Into a four necked flask provided with a motor driven stirrer, were added the trimellitoyl-functional polymer, which had been prepared by reacting polybutadiene glycol of the trade name, R.45M (2,500 number average molecular weight, ARCO Chemical Corporation, USA) with trimellitic anhydride monochloride, and each of the low molecular weight acid anhydrides respectively as shown in the following Table 1 in the equivalent ratio of 1 : 1 with respect to the respective acid anhydride group. Said trimellitoyl-functional polymer and the acid anhydride compound were homogeneously melted in a nitrogen gas atmosphere, at a temperature of 100° to 150°C with stirring. The melted mixture was cooled down to a temperature of 60° to 80°C while continuing the stirring, and to this mixture there were added the epoxy resin of the trade name, Araldite GY-260 (a bisphenol type epoxy resin having an epoxy equivalent of 180 to 200, manufactured by CIBA Geigy A.G., Switzerland) in the amount of 2 equivalent epoxy groups relative to 1 equivalent acid anhydride groups of said trimellitoyl-functional polymer, and 0.025 mole dimethylbenzylamine as catalyst relative to 1 equivalent of the epoxy resin, to be subjected to defoaming treatment under vacuum. The homogeneously melted mixture was poured into a metal mold of 1 mm thickness to proceed with the curing at 150°C for 3 hours, to obtain the elastomer products respectively whose physical properties are shown in Table 1.

The test pieces were prepared by means of a dumbell of DIN No. 3 in the thickness of 1 mm. Tensile strength and elongation at break were measured at room temperature and by 500 mm/min. of tension speed, and tear strength was measured by making three cuttings of 1.5 mm depth at the center and portions of 1.5 mm respectively from the center of the test piece at room temperature and by 200 mm/min. of tension speed, respectively according to the Tensilon tensile tester.

The physical properties of the product prepared as above but without adding any low molecular weight acid anhydride compound are shown as Reference Example 1 in the following table as control.

TABLE I

| Ex. | Low Mol. Wt. Acid Anhydride Compound | Tensile Strength $T_b$(kg/cm$^2$) | Elong. At Break $E_b$(%) | Tear Strength (kg/cm) |
|---|---|---|---|---|
| 1 | Succinic Anhydride | 37 | 50 | 3.1 |
| 2 | Maleic Anhydride | 31 | 50 | 2.5 |
| 3 | Hexahydrophthalic Anhydride | 54 | 50 | 4.4 |
| 4 | Phthalic Anhydride | 51 | 50 | 4.8 |
| 5 | Pyromellitic Anhydride | 32 | 50 | 2.8 |
| 6 | Ethylene Glycol Bistrimellitate | 30 | 40 | 2.3 |
| Ref. Ex.1 | — | 21 | 50 | 1.7 |

EXAMPLE 7

Under the same conditions as in Examples 1 to 6 but without addition of any catalyst, the trimellitoyl-functional polymer was mixed with phthalic anhydride in the equivalent ratio of 1 : 1, to which mixture epoxy resin, GY-260 was added in the amount of 1 equivalent relative to 0.85 equivalent of acid anhydride group of said polymer and phthalic acid anhydride to obtain an elastomer product whose properties were; tensile strength $T_b$ 52 kg/cm$^2$, elongation at break $E_b$ 80%, tear strength 4.7 kg/cm.

EXAMPLE 8

Under the same conditions as in Examples 1 to 6, the curing was carried out except that the three reactants, i.e. the trimellitoyl-functional polymer, phthalic anhydride and the epoxy resin GY-260 were mixed in the equivalent ratio of 1 : 2 : 3, to obtain an elastomer product whose properties were: tensile strength $T_b$ 84 kg/cm$^2$, elongation at break $E_b$ 70%, tear strength 5.3 kg/cm.

EXAMPLES 9 to 11

Under the same conditions as in Examples 1 to 6, three trimellitoyl-functional polymers were prepared respectively from polybutadiene glycol R.45M, polytetramethylene ether glycol PTG-500 (number average molecular weight 2,040, Nippon Polyurethane Industry Co., Ltd., Japan) and polyethylene adipate glycol EA-2500 (number average molecular weight 2,488, ditto), to each of which were added phthalic anhydride in the equivalent ratio of 1 : 1 and the epoxy resin of the trade name, Epikote 1004 (a bisphenol type epoxy resin having an epoxy equivalent of 900 to 1000 and manufactured by Shell International Chemicals Corp., Britain) in the amount of 1 equivalent relative to 0.85 equivalent of total acid anhydride groups of said polymer and phthalic acid anhydride, to mix and proceed with the curing without any catalyst. The physical properties of the respective elastomer products are shown in the following Table 2.

Similarly without addition of phthalic acid anhydride, the corresponding three elastomers were prepared with the amount of the epoxy resin Epikote 1004 by 1 equivalent relative to 0.85 equivalent of the respective trimellitoyl-functional polymer, whose physical properties are shown in the Table as Reference Examples 2, 3 and 4.

TABLE 2

| Ex. | Glycol For Trimellitoyl-Functional Polymer | Tensile Strength $T_b$(kg/cm$^2$) | Elong. At Break $E_b$(%) | Tear Strength (kg/cm) |
|---|---|---|---|---|
| 9 | Polybutadiene Glycol | | | |

TABLE 2-continued

| Ex. | Glycol For Trimellitoyl-Functional Polymer | Tensile Strength Tb(kg/cm²) | Elong. At Break Eb(%) | Tear Strength (kg/cm) |
| --- | --- | --- | --- | --- |
|  | R.45M | 248.9 | 50 | 12.8 |
| Ref.Ex.2 | — | 171.9 | 100 | 4.0 |
| 10 | Polytetramethylene Ether glycol PTG 500 | 254.3 | 130 | 54.6 |
| Ref.Ex.3 | — | 174.7 | 180 | 7.6 |
| 11 | Polyethylene Adipate Glycol EA 2500 | 292.1 | 70 | 46.0 |
| Ref.Ex.4 | — | 136.8 | 200 | 4.6 |

What is claimed is:

1. Process for the manufacture of an elastomer comprising the steps of mixing (A) at least one trimellitoyl-functional polymer represented by the formula:

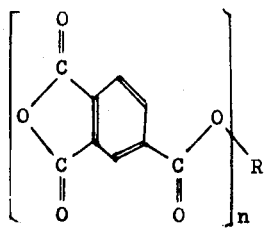

in which R represents a residue of an hydroxyl-functional polymer and n is an integer of at least 2, said trimellitoyl-functional polymer being prepared by the reaction of an hydroxyl-functional polymer having a number average molecular weight higher than 700, and having at least two hydroxy groups at the chain ends of the side chain, with trimellitic anhydride or a derivative thereof; (B) at least one polyglycidyl ether of bisphenol A; and (C) at least one acid anhydride compound having a molecular weight lower than 700, and having at least one acid anhydride group, and proceeding with curing at an elevated temperature and wherein the low molecular weight acid anhydride compound is added in the amount of 0.5 to 2.0 equivalents relative to 1 equivalent of the acid anhydride group of the trimellitoyl-functional polymer, and the total amount of the trimellitoyl-functional polymer and the low molecular weight acid anhydride compound is such that the equivalent ratio of total acid anhydride groups of the trimellitoyl-functional polymer and the low molecular weight acid anhydride compound to the epoxy groups of the epoxy compound is 0.5 to 1.5.

2. An elastomer as claimed in claim 1, in which said hydroxyl-functional polymer is made from polybutadiene, butadiene-styrene copolymer, polyisoprene, butadiene-acrylonitrile copolymer, butadiene-acrylate copolymer ethylene-propylene-diene terpolymer, polyethylene adipate or polytetramethylene ether.

3. Process as claimed in claim 1, in which the low molecular weight acid anhydride compound has one acid anhydride group.

4. An elastomer as claimed in claim 1, in which said anhydride is selected from the group consisting of maleic, phthalic, tetrahydrophthalic, hexahydrophthalic, methyltetrahydrophthalic, succinic and adipic acid anhydrides.

5. Process as claimed in claim 1, in which the low molecular weight acid anhydride compound has one acid anhydride group and a carboxy group.

6. An elastomer as claimed in claim 1, in which said anhydride is selected from the group consisting of trimellitic and tricarballylic acid anhydrides.

7. Process as claimed in claim 1, in which the low molecular weight acid anhydride compound has two acid anhydride groups.

8. An elastomer as claimed in claim 1, in which said anhydride is selected from the group consisting of pyromellitic, benzophenone tetracarboxylic acid anhydrides, ethylene glycol bistrimellitate and xylene glycol bistrimellitate.

9. Process as claimed in claim 1, in which the low molecular weight acid anhydride compound has three acid anhydride groups.

10. An elastomer as claimed in claim 1, in which said anhydride is glycerine tristrimellitate.

11. Process as claimed in claim 1, in which the curing temperature ranges from 100° to 200°C.

12. The elastomer prepared by the process of claim 1.

* * * * *